United States Patent
Jenkins Sanchez et al.

(10) Patent No.: US 12,433,740 B2
(45) Date of Patent: Oct. 7, 2025

(54) DIFFRACTIVE LENSES FOR RANGE OF VISION

(71) Applicant: AMO Groningen B.V., Groningen (NL)

(72) Inventors: Mark Jenkins Sanchez, Groningen (NL); Hendrik A. Weeber, Groningen (NL); Miguel Faria Ribeiro, Braga (PT)

(73) Assignee: AMO Groningen B.V., Groningen (NL)

( * ) Notice: Subject to any disclaimer, the term of this patent is extended or adjusted under 35 U.S.C. 154(b) by 228 days.

(21) Appl. No.: 17/811,058

(22) Filed: Jul. 6, 2022

(65) Prior Publication Data

US 2023/0011320 A1 Jan. 12, 2023

Related U.S. Application Data

(60) Provisional application No. 63/203,153, filed on Jul. 9, 2021.

(51) Int. Cl.
*A61F 2/16* (2006.01)

(52) U.S. Cl.
CPC .......... *A61F 2/1654* (2013.01); *A61F 2/1618* (2013.01); *A61F 2/1656* (2013.01)

(58) Field of Classification Search
CPC .............................. A61F 2/1654; A61F 2/1656
See application file for complete search history.

(56) References Cited

U.S. PATENT DOCUMENTS

| | | | |
|---|---|---|---|
| 4,210,391 A | 7/1980 | Cohen et al. | |
| 5,017,000 A | 5/1991 | Cohen | |
| 7,156,516 B2 | 1/2007 | Morris et al. | |
| 7,188,949 B2 | 3/2007 | Bandhauer et al. | |
| 7,455,404 B2 | 11/2008 | Bandhauer et al. | |
| 7,922,326 B2 | 4/2011 | Bandhauer et al. | |
| 7,984,990 B2 | 7/2011 | Bandhauer et al. | |
| 8,157,374 B2 | 4/2012 | Bandhauer et al. | |
| 8,480,228 B2 | 7/2013 | Weeber | |
| 8,500,805 B2 | 8/2013 | Kobayashi et al. | |
| 8,506,075 B2 | 8/2013 | Bandhauer et al. | |
| 8,531,783 B2 | 9/2013 | Zalevsky et al. | |
| 8,636,796 B2 | 1/2014 | Houbrechts et al. | |
| 8,678,583 B2 | 3/2014 | Cohen | |

(Continued)

FOREIGN PATENT DOCUMENTS

| | | |
|---|---|---|
| CN | 109477913 B | 8/2021 |
| CN | 113244019 A | 8/2021 |

(Continued)

OTHER PUBLICATIONS

Loicq J., et al., "Topography and longitudinal chromatic aberration characterizations of refractive-diffractive multifocal intraocular lenses," Journal of Cataract and Refractive Surgery, 2019, vol. 45 (11), pp. 1650-1659.

(Continued)

*Primary Examiner* — Megan Y Wolf

(57) ABSTRACT

Apparatuses, systems and methods for providing improved ophthalmic lenses, particularly intraocular lenses (IOLs), include features for providing a range of vision. Chromatic aberrations may be reduced at near, distance, and intermediate vision.

33 Claims, 6 Drawing Sheets

(56) References Cited

U.S. PATENT DOCUMENTS

| | | |
|---|---|---|
| 8,755,117 B2 | 6/2014 | Kobayashi et al. |
| 8,913,331 B2 | 12/2014 | Zalevsky et al. |
| 9,089,421 B2 | 7/2015 | Carson et al. |
| 9,304,329 B2 | 4/2016 | Zhao |
| 9,320,594 B2 | 4/2016 | Schwiegerling |
| 9,335,563 B2 | 5/2016 | Weeber |
| 9,429,768 B2 | 8/2016 | Zalevsky et al. |
| 9,557,580 B2 | 1/2017 | Weeber et al. |
| 9,563,070 B2 | 2/2017 | Ando et al. |
| 9,658,471 B2 | 5/2017 | Ando et al. |
| 10,197,815 B2 | 2/2019 | Weeber et al. |
| 10,209,533 B2 | 2/2019 | Schwiegerling |
| 10,288,901 B2 | 5/2019 | Weeber |
| 10,295,841 B2 | 5/2019 | Ando |
| 10,426,599 B2 | 10/2019 | Choi et al. |
| 10,531,950 B2 | 1/2020 | Tiwari et al. |
| 10,564,448 B2 | 2/2020 | Ando |
| 10,568,734 B2 | 2/2020 | Mackool |
| 10,698,234 B2 | 6/2020 | Zhao |
| 10,725,320 B2 | 7/2020 | Schwiegerling |
| 10,747,022 B2 | 8/2020 | Ando et al. |
| 10,838,237 B2 | 11/2020 | Van Heugten et al. |
| 10,842,617 B2 | 11/2020 | Hong et al. |
| 10,871,659 B2 | 12/2020 | Hong et al. |
| 10,993,798 B2 | 5/2021 | Choi et al. |
| 11,009,723 B2 | 5/2021 | Ando |
| 11,029,536 B2 | 6/2021 | Lux et al. |
| 11,106,056 B2 * | 8/2021 | Zhang ................ A61F 2/1618 |
| 11,129,707 B2 | 9/2021 | Pagnoulle et al. |
| 11,156,853 B2 | 10/2021 | Weeber et al. |
| 11,199,725 B2 | 12/2021 | Schwiegerling |
| 11,324,588 B2 | 5/2022 | De Carvalho et al. |
| 11,327,210 B2 | 5/2022 | Weeber et al. |
| 11,344,404 B2 | 5/2022 | Tiwari et al. |
| 11,364,112 B2 | 6/2022 | Hong et al. |
| 2006/0098162 A1 * | 5/2006 | Bandhauer ............ G02C 7/042 351/159.44 |
| 2011/0149236 A1 | 6/2011 | Weeber |
| 2012/0140166 A1 | 6/2012 | Zhao |
| 2018/0092739 A1 * | 4/2018 | Pagnoulle ............ A61F 2/1654 |
| 2018/0368972 A1 | 12/2018 | Rosen et al. |
| 2019/0004331 A1 | 1/2019 | Weeber et al. |
| 2019/0142577 A1 | 5/2019 | Xie |
| 2019/0307557 A1 | 10/2019 | De Carvalho et al. |
| 2019/0314148 A1 | 10/2019 | Liu |
| 2020/0038172 A1 | 2/2020 | Hussain et al. |
| 2020/0315779 A1 | 10/2020 | Rosen et al. |
| 2020/0315780 A1 | 10/2020 | Rosen et al. |
| 2020/0315781 A1 | 10/2020 | Rosen et al. |
| 2020/0315782 A1 | 10/2020 | Rosen et al. |
| 2020/0315783 A1 | 10/2020 | Rosen et al. |
| 2020/0315848 A1 | 10/2020 | Rosen et al. |
| 2020/0315849 A1 | 10/2020 | Rosen et al. |
| 2020/0315850 A1 | 10/2020 | Rosen et al. |
| 2020/0326562 A1 | 10/2020 | Zhao |
| 2021/0059812 A1 | 3/2021 | Kontur et al. |
| 2021/0063767 A1 | 3/2021 | Hong et al. |
| 2021/0196451 A1 | 7/2021 | Rosen et al. |
| 2021/0196452 A1 | 7/2021 | Gounou et al. |
| 2021/0196453 A1 | 7/2021 | Rosen et al. |
| 2021/0220118 A1 | 7/2021 | Choi et al. |
| 2021/0286196 A1 | 9/2021 | Weeber |
| 2021/0294123 A1 | 9/2021 | Weeber et al. |
| 2021/0369445 A1 * | 12/2021 | Chiu ................ G02B 5/1895 |
| 2022/0011593 A1 | 1/2022 | Zheleznyak |
| 2022/0031447 A1 | 2/2022 | Attia et al. |
| 2022/0043281 A1 | 2/2022 | Weeber et al. |
| 2022/0113557 A1 | 4/2022 | Hong |
| 2022/0133469 A1 | 5/2022 | Liu |
| 2022/0171214 A1 | 6/2022 | Weeber et al. |
| 2022/0197055 A1 | 6/2022 | Schwiegerling |

FOREIGN PATENT DOCUMENTS

| | | |
|---|---|---|
| CN | 113693779 A | 11/2021 |
| CN | 113331994 B | 12/2021 |
| EP | 3939543 A1 | 1/2022 |
| EP | 3998989 A1 | 5/2022 |
| WO | 2013118177 A1 | 8/2013 |
| WO | 2014189049 A1 | 11/2014 |
| WO | 2020115104 A1 | 6/2020 |
| WO | 2020132703 A1 | 6/2020 |
| WO | 2021156203 A1 | 8/2021 |
| WO | 2022014723 A1 | 1/2022 |
| WO | 2022039682 A1 | 2/2022 |
| WO | 2022039683 A1 | 2/2022 |

OTHER PUBLICATIONS

Morlock, R., et al., "Patient-Reported Spectacle Independence Questionnaire (PRSIQ): Development and Validation," American Journal of Ophthalmology, Jun. 2017, vol. 178, pp. 101-114.

* cited by examiner

DIFFRACTIVE LENSES FOR RANGE OF VISION

CROSS-REFERENCE TO RELATED APPLICATIONS

This application claims priority to U.S. Provisional Patent Application No. 63/203,153, filed Jul. 9, 2021, which is incorporated herein by reference in its entirety.

BACKGROUND

Embodiments of the present disclosure relate to vision treatment techniques and in particular, to ophthalmic lenses such as, for example, contact lenses, corneal inlays or onlays, or intraocular lenses (IOLs) including, for example, phakic IOLs and piggyback IOLs (i.e. IOLs implanted in an eye already having an IOL).

Presbyopia is a condition that affects the accommodation properties of the eye. As objects move closer to a young, properly functioning eye, the effects of ciliary muscle contraction and zonular relaxation allow the lens of the eye to change shape, and thus increase its optical power and ability to focus at near distances. This accommodation can allow the eye to focus and refocus between near and far objects.

Presbyopia normally develops as a person ages and is associated with a natural progressive loss of accommodation. The presbyopic eye often loses the ability to rapidly and easily refocus on objects at varying distances. The effects of presbyopia usually become noticeable after the age of 45 years. By the age of 65 years, the crystalline lens has often lost almost all elastic properties and has only a limited ability to change shape.

Along with reductions in accommodation of the eye, age may also induce clouding of the lens due to the formation of a cataract. A cataract may form in the hard central nucleus of the lens, in the softer peripheral cortical portion of the lens, or at the back of the lens. Cataracts can be treated by the replacement of the cloudy natural lens with an artificial lens. An artificial lens replaces the natural lens in the eye, with the artificial lens often being referred to as an intraocular lens or "IOL."

Monofocal IOLs are intended to provide vision correction at one distance only, usually the far focus. At the very least, since a monofocal IOL provides vision treatment at only one distance and since the typical correction is for far distance, spectacles are usually needed for good vision at near distances and sometimes for good vision at intermediate distances. The term "near vision" generally corresponds to vision provided when objects are at a distance from the subject eye at equal; or less than 1.5 feet. The term "distance vision" generally corresponds to vision provided when objects are at a distance of at least about 5-6 feet or greater. The term "intermediate vision" corresponds to vision provided when objects are at a distance of about 1.5 feet to about 5-6 feet from the subject eye. Such characterizations of near, intermediate, and distance vision correspond to those addressed in Morlock R, Wirth R J, Tally S R, Garufis C, Heichel C W D, Patient-Reported Spectacle Independence Questionnaire (PRSIQ): Development and Validation. Am J Ophthalmology 2017; 178:101-114.

There have been various attempts to address limitations associated with monofocal IOLs. For example, multifocal IOLs have been proposed that deliver, in principle, two foci, one near and one far, optionally with some degree of intermediate focus. Such multifocal, or bifocal, IOLs are intended to provide good vision at two distances, and include both refractive and diffractive multifocal IOLs. In some instances, a multifocal IOL intended to correct vision at two distances may provide a near (add) power of about 2.5 or 4.0 diopters.

Multifocal IOLs may, for example, rely on a diffractive optical surface to direct portions of the light energy toward differing focal distances, thereby allowing the patient to clearly see both near and far objects. Depending on the configuration, multifocal IOLs may also allow a patient to see intermediate vision. More recently diffractive optical surfaces have created extended depth of focus and/or extended range of vision lenses which allow for continuous vision from far to near. Diffractive optical surfaces may also be configured to provide reduced chromatic aberration. Multifocal lenses (including contact lenses or the like) have also been proposed for treatment of presbyopia without removal of the natural crystalline lens.

Current state of the art diffractive monofocal, extended depth of focus (EDOF), and multifocal lenses, and in general, non-accommodative lenses providing a full range of vision, can make use of a material having a given refractive index and a surface curvature which provide a refractive power. Diffractive lenses have a diffractive profile which confers the lens with diffractive powers that may contribute to the overall optical power of the lens. The diffractive profile is typically characterized by a number of diffractive zones. When used for ophthalmic lenses these zones are typically annular lens zones, or echelettes, spaced about the optical axis of the lens. One or more, or each echelette may be defined by an optical zone, a transition zone, and an echelette geometry. The echelette geometry includes an inner and outer diameter and a shape or slope of the optical zone, a height or step height, and a shape of the transition zone. The surface area or diameter of the echelettes largely determines the diffractive power(s) of the lens. The slope of the optical zone is the gradient of the diffractive profile, e.g. the gradient varies across the echelette. The height, the width and the shape of the transition zone between echelettes largely determines the light distribution between the different powers or diffractive orders. Together, these echelettes form a diffractive profile.

A multifocal diffractive profile of the lens may be used to mitigate presbyopia by providing two or more optical powers; for example, one for near vision and one for distance vision. The lenses may also take the form of an intraocular lens placed within the capsular bag of the eye, replacing the original lens, or placed in front of the natural crystalline lens. The lenses may also be in the form of a contact lens, most commonly a bifocal contact lens, or in any other form mentioned herein.

Although multifocal ophthalmic lenses lead to improved quality of vision for many patients, additional improvements would be beneficial. For example, some pseudophakic patients experience undesirable visual effects (dysphotopsia), e.g. glare or halos. Halos may arise when light from the unused focal image plane creates an out-of-focus image that is superimposed on the used focal image. For example, if light from a distant point source is imaged onto the retina by the distant focus of a bifocal IOL, the near focus of the IOL will simultaneously superimpose a defocused image on top of the image formed by the distant focus. This defocused image may manifest itself in the form of a ring of light surrounding the in-focus image, and is referred to as a halo. Another area of improvement revolves around the typical bifocality of multifocal lenses. While multifocal ophthalmic lenses typically provide adequate near and far vision, intermediate vision may be compromised.

Improvements may also be found in the field of a range of vision for the ophthalmic lens. An improved range of vision may allow for good vision at a variety of distances, including vision at intermediate distances. Improvements in a range of vision may thus be desired.

BRIEF SUMMARY

Embodiments herein described include ophthalmic lenses including an optic disposed about an optical axis and having an anterior surface and a posterior surface, and including a diffractive profile including a plurality of echelettes, wherein at least one of the echelettes includes an optical zone, wherein the optical zone includes a subshape having a gradual change in slope that includes a change in sign of the slope. For example, this may mean a change in the slope from positive to negative, or vice-versa.

Embodiments herein described include a method including fabricating an optic for an ophthalmic lens, the optic being disposed about an optical axis and having an anterior surface and a posterior surface, and including a diffractive profile including a plurality of echelettes, wherein at least one of the echelettes includes an optical zone, wherein the optical zone includes a sub shape having a gradual change in slope that includes a change in sign of the slope.

Embodiments herein described include a system for fabricating an ophthalmic lens. The system may include a processor configured to determine at least a portion of a profile of an optic disposed about an optical axis and having an anterior surface and a posterior surface, and including a diffractive profile including a plurality of echelettes, wherein at least one of the echelettes includes an optical zone, wherein the optical zone includes a subshape having a gradual change in slope that includes a change in sign of the slope. The system may include a manufacturing assembly that fabricates the optic based on the profile.

In one embodiment, each echelette of the plurality of echelettes includes an optical zone including a subshape having a gradual change in slope that includes a change in sign of the slope. Each subshape may comprise a height variation with respect to a diffractive profile of the echelette were the subshape not present on the echelette. The height variation may be less than 25% of an overall height of the echelette, or less than 20% of an overall height of the echelette, or less than 15% of an overall height of the echelette, or less than 10% of an overall height of the echelette, or less than 5% of an overall height of the echelette.

In one embodiment, the optic includes a central zone and the diffractive profile is positioned on the central zone. The central zone may have a first refractive shape, and the optic may include a peripheral zone having a second refractive shape with a greater curvature than the first refractive shape. Optionally, the peripheral zone has a refractive profile.

In one embodiment, the diffractive profile is configured to provide distance vision at the second diffractive order. The central zone may have a first refractive shape, and the optic may include a peripheral zone having a second refractive shape with a same curvature as the first refractive shape. The diffractive profile may be a first diffractive profile and the optic may include a peripheral zone including a second diffractive profile having a plurality of parabolic echelettes having heights of 1 wavelength. Optionally, the diffractive profile may be configured to provide distance vision at the first diffractive order.

In one embodiment, at least one of the plurality of echelettes is non-parabolic. The plurality of echelettes may include a set of at least two echelettes that repeats in r-squared space upon the optic. The set may repeat in r-squared space at least two times upon the optic. The set may repeat in r-squared space at least three times upon the optic. Each of the at least two echelettes of the set may be non-parabolic. Optionally, the set may include at least two echelettes and a portion of a third echelette, the set repeating in r-squared space upon the optic. Optionally, the set may include a portion of a fourth echelette, the set repeating in r-squared space upon the optic. A height of a transition zone of at least one of the plurality of echelettes may be between 0.9 and 1.1 wavelength. Optionally, a height of a transition zone at least one of the plurality of echelettes is between 1 wavelength and 2 wavelengths.

In one embodiment, the slope of the subshape changes two times. A slope of the optical zone including the subshape may be negative, and the slope of the subshape may change gradually to become positive and subsequently changes gradually to become negative. The subshape may be positioned on a middle portion of one of the plurality of echelettes. Optionally, the subshape may have a height that is less than a height of a transition zone of the echelette. The one of the plurality of echelettes may repeat in r-squared space upon the optic. Optionally, the subshape repeats in r-squared space upon the optic. The plurality of echelettes may include a set of at least two echelettes and a portion of the subshape, the set repeating in r-squared space upon the optic.

In one embodiment, the diffractive profile may include a plurality of transition zones of the plurality of echelettes, at least one of the plurality of transition zones being a vertical transition zone and at least one of the plurality of transition zones being a curved transition zone. The curved transition zone may repeat in r-squared space upon the optic. A height of a transition zone of the plurality of echelettes may be the same for all echelettes in r-squared space. The diffractive profile may be positioned upon the posterior surface and the anterior surface is an aspheric surface. Optionally, the aspheric surface reduces corneal spherical aberration. Optionally, the optic has a greater chromatic correction at an intermediate vision than at a distance vision. The optic may have a greater chromatic correction at an intermediate vision than at a near vision.

In one embodiment, the present invention provides systems and methods for fabricating an intraocular lens. The method may include receiving an ophthalmic lens prescription, and fabricating the optic based on the ophthalmic lens prescription. The method may include determining the diffractive profile based on the ophthalmic lens prescription.

In one embodiment, a plurality of the echelettes each includes an optical zone including a subshape having a gradual change in slope that includes a change in sign of the slope. The subshape may comprise a height variation with respect to the echelette. the height variation is less than 25% of an overall height of the echelette, or less than 20% of an overall height of the echelette, or less than 15% of an overall height of the echelette, or less than 10% of an overall height of the echelette, or less than 5% of an overall height of the echelette.

In one embodiment, the optic includes a central zone having a first refractive shape, and the optic includes a peripheral zone having a second refractive shape with a greater curvature than the first refractive shape. The optic may include a central zone having a first refractive shape, and the optic may include a peripheral zone having a second refractive shape with a same curvature as the first refractive shape. The diffractive profile may be a first diffractive profile and the optic may include a peripheral zone including a second diffractive profile having a plurality of parabolic echelettes having heights of 0.9 and 1.1 wavelength.

In one embodiment, at least one of the plurality of echelettes is non-parabolic. The plurality of echelettes may include a set of at least two echelettes that repeats in r-squared space upon the optic. The slope of the subshape may change two times. A slope of the optical zone including the subshape may be negative, and the slope of the subshape may change gradually to become positive and subsequently may change gradually to become negative.

In one embodiment, the present invention may encompass computer systems and methods for fabricating an ophthalmic lens. Exemplary computer systems may include a processor configured to determine at least a portion of a profile of an optic disposed about an optical axis and having an anterior surface and a posterior surface, a diffractive profile may include a plurality of echelettes and a plurality of optical zones of the plurality of echelettes, wherein at least one of the plurality of optical zones may include a subshape having a gradual change in slope that may include a change in sign of the slope, and a manufacturing assembly that may fabricate the optic based on the profile. Optionally, the computer system may include an input for receiving an ophthalmic lens prescription, and wherein the processor may be configured to determine the diffractive profile based on the ophthalmic lens prescription.

In one embodiment, a plurality of the echelettes each includes an optical zone including a subshape having a gradual change in slope that includes a change in sign of the slope. The subshape may comprise a height variation with respect to the echelette. The height variation may be less than 25% of an overall height of the echelette, or less than 20% of an overall height of the echelette, or less than 15% of an overall height of the echelette, or less than 10% of an overall height of the echelette, or less than 5% of an overall height of the echelette.

In one embodiment, the optic may include a central zone having a first refractive shape, and the optic may include a peripheral zone having a second refractive shape with a greater curvature than the first refractive shape. The optic may include a central zone having a first refractive shape, and the optic may include a peripheral zone having a second refractive shape with a same curvature as the first refractive shape. The diffractive profile may be a first diffractive profile and the optic may include a peripheral zone including a second diffractive profile having a plurality of parabolic echelettes having heights of 1 wavelength.

In one embodiment, at least one of the plurality of echelettes may be non-parabolic. The plurality of echelettes may include a set of at least two echelettes that repeats in r-squared space upon the optic. The plurality of echelettes may include a set of at least three echelettes that repeats in r-squared space upon the optic.

In one embodiment, the slope of the sub shape may change two times. Optionally, a slope of the optical zone including the subshape is negative, and the slope of the subshape changes gradually to become positive and subsequently changes gradually to become negative.

DETAILED DESCRIPTION

FIGS. 1A, 1B, 2A, 2B, 3A and 3B illustrate multifocal IOL lens geometries, aspects of which are described in U.S. Patent Publication No. 2011-0149236 A1, which is hereby incorporated by reference in its entirety.

Figure 1A:
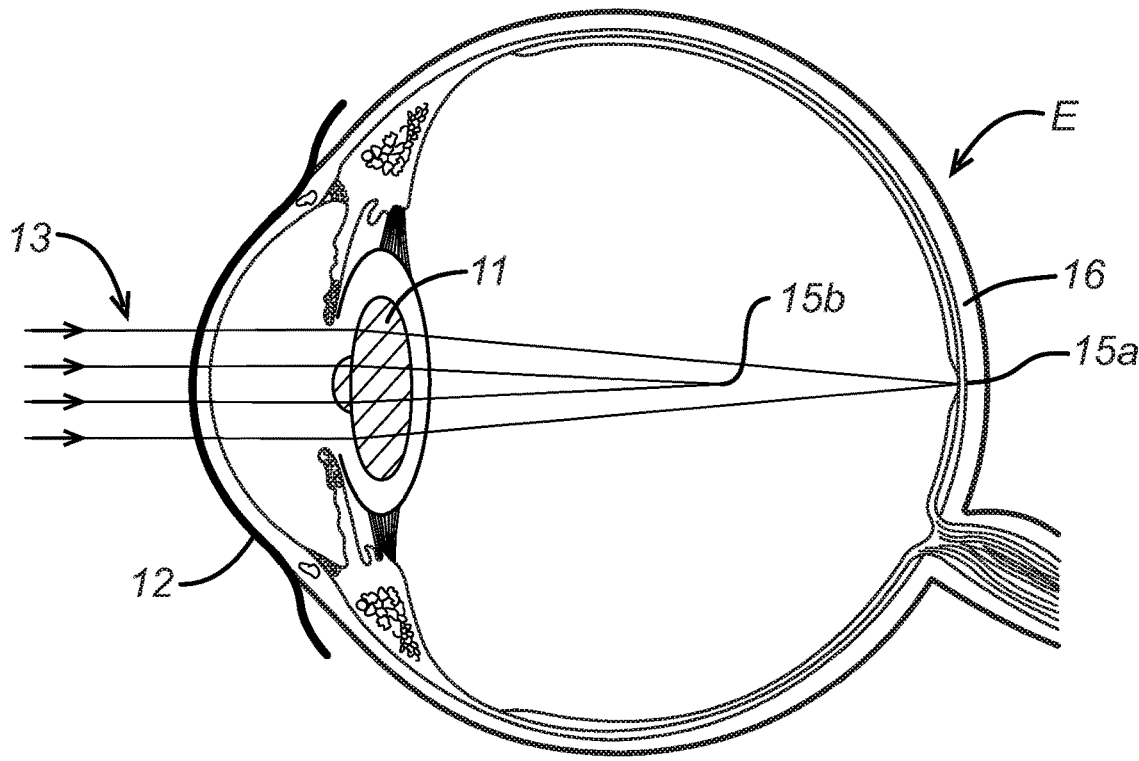
FIG. 1A illustrates a cross-sectional view of an eye with an implanted multifocal refractive intraocular lens.

FIG. 1A is a cross-sectional view of an eye E fit with a multifocal IOL 11. As shown, multifocal IOL 11 may, for example, comprise a bifocal IOL. Multifocal IOL 11 receives light from at least a portion of cornea 12 at the front of eye E and is generally centered about the optical axis of eye E. For ease of reference and clarity, FIGS. 1A and 1B do not disclose the refractive properties of other parts of the eye, such as the corneal surfaces. Only the refractive and/or diffractive properties of the multifocal IOL 11 are illustrated.

Each major face of lens 11, including the anterior (front) surface and posterior (back) surface, generally has a refractive profile, e.g. biconvex, plano-convex, plano-concave, meniscus, etc. The two surfaces together, in relation to the properties of the surrounding aqueous humor, cornea, and other optical components of the overall optical system, define the effects of the lens 11 on the imaging performance by eye E. Conventional, monofocal IOLs have a refractive power based on the refractive index of the material from which the lens is made, and also on the curvature or shape of the front and rear surfaces or faces of the lens. One or more support elements may be configured to secure the lens 11 to a patient's eye.

Multifocal lenses may optionally also make special use of the refractive properties of the lens. Such lenses generally include different powers in different regions of the lens so as to mitigate the effects of presbyopia. For example, as shown in FIG. 1A, a perimeter region of refractive multifocal lens 11 may have a power which is suitable for viewing at far viewing distances. The same refractive multifocal lens 11 may also include an inner region having a higher surface curvature and a generally higher overall power (sometimes referred to as a positive add power) suitable for viewing at near distances.

Figure 1B:
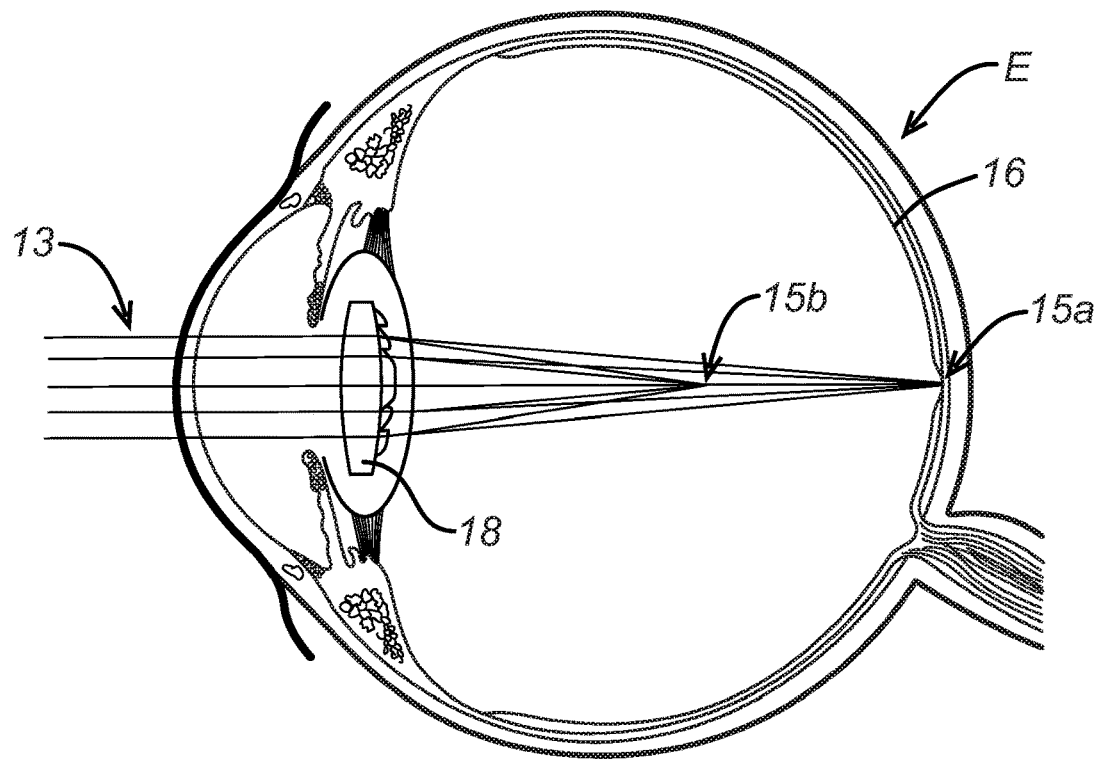
FIG. 1B illustrates a cross-sectional view of an eye having an implanted multifocal diffractive intraocular lens.

Rather than relying entirely on the refractive properties of the lens, multifocal diffractive IOLs or contact lenses can also have a diffractive power, as illustrated by the IOL 18 shown in FIG. 1B. The diffractive power can, for example, comprise positive or negative power, and that diffractive power may be a significant (or even the primary) contributor to the overall optical power of the lens. The diffractive power is conferred by a plurality of concentric diffractive zones which form a diffractive profile. The diffractive profile may be a geometric microstructure superimposed on a refractive base shape of a refractive optic of the lens. The diffractive profile may either be imposed on the anterior surface or posterior surface or both.

The diffractive profile of a diffractive multifocal lens directs incoming light into a number of diffractive orders. As light 13 enters from the front of the eye, the multifocal lens 18 directs light 13 to form a far field focus 15a on retina 16 for viewing distant objects and a near field focus 15b for viewing objects close to the eye. Depending on the distance from the source of light 13, the focus on retina 16 may be the near field focus 15b instead. Typically, far field focus 15a is associated with $0^{th}$ diffractive order and near field focus 15b is associated with the $1^{st}$ diffractive order, although other orders may be used as well.

Bifocal ophthalmic lens 18 typically distributes the majority of light energy into two viewing orders, often with the goal of splitting imaging light energy about evenly (50%: 50%), one viewing order corresponding to distance vision and one viewing order corresponding to near vision, although typically, some fraction goes to non-viewing orders.

Corrective optics may be provided by phakic IOLs, which can be used to treat patients while leaving the natural lens in place. Phakic IOLs may be angle supported, iris supported, or sulcus supported. The phakic IOL can be placed over the natural crystalline lens or piggy-backed over another IOL. It is also envisioned that the present disclosure may be applied to inlays, onlays, accommodating IOLs, pseudophakic IOLs, other forms of intraocular implants, spectacles, and even laser vision correction.

Figure 2A:
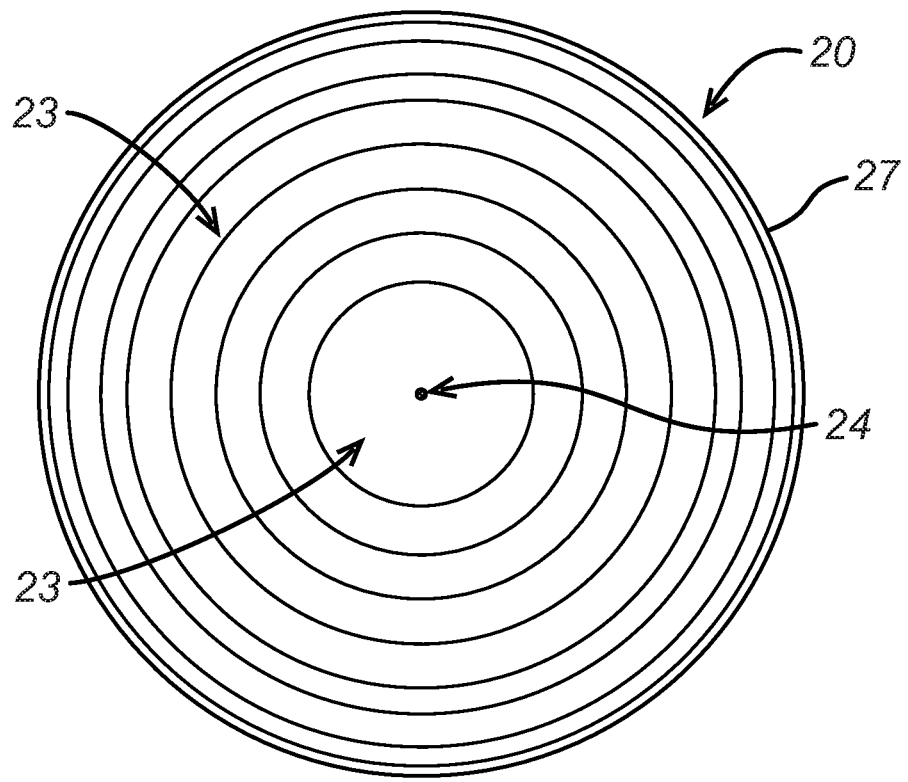
FIG. 2A illustrates a front view of a diffractive multifocal intraocular lens.
Figure 2B:
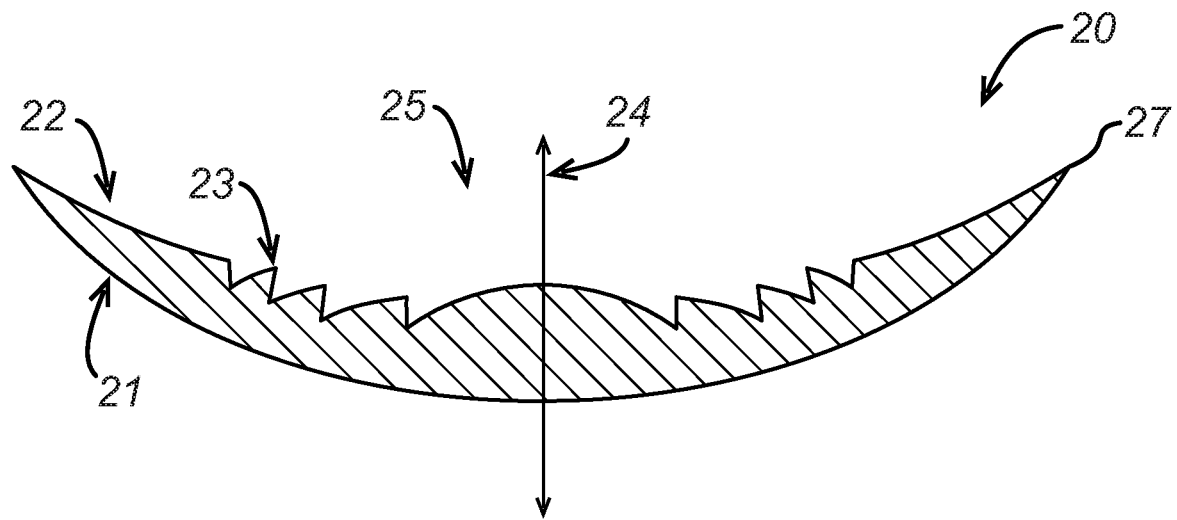
FIG. 2B illustrates a cross-sectional view of a diffractive multifocal intraocular lens.

FIGS. 2A and 2B show aspects of a conventional diffractive multifocal lens 20. Multifocal lens 20 may have certain optical properties that are generally similar to those of multifocal IOLs 11, 18 described above. Multifocal lens 20 has an anterior lens surface 21 and a posterior lens surface 22 disposed about an optical axis 24. The surfaces 21, 22, or lens faces, extend radially outward from the optical axis 24 to an outer periphery 27 of the optic. The optical axis 24 may extend through a central zone 25 of the optic. The surfaces 21, 22, or optical surfaces, face opposite each other.

When fitted onto the eye of a subject or patient, the optical axis of lens 20 is generally aligned with the optical axis of eye E. The curvature of lens 20 gives lens 20 an anterior refractive profile and a posterior refractive profile. Although a diffractive profile may also be imposed on either anterior surface 21 or posterior surface 22 or both, FIG. 2B shows posterior surface 22 with a diffractive profile. The diffractive profile is characterized by a plurality of annular diffractive zones or echelettes 23 spaced about optical axis 24. While analytical optics theory generally assumes an infinite number of echelettes, a standard multifocal diffractive IOL typically has at least 7 echelettes, and may have over 30 echelettes. For the sake of clarity, FIG. 2B shows only 4 echelettes. Typically, an IOL is biconvex, or possibly plano-convex, or convex-concave, although an IOL could be plano-plano, or other refractive surface combinations.

Figure 3A:
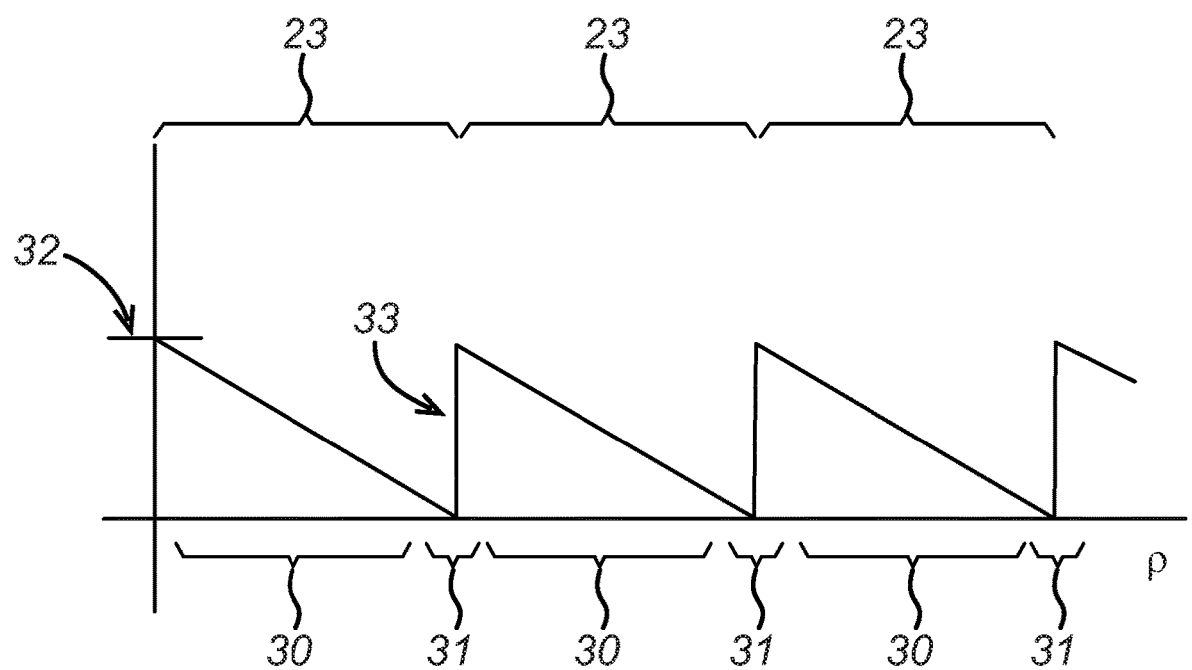
FIGS. 3A-3B are graphical representations of a portion of the diffractive profile of a conventional diffractive multifocal lens.
Figure 3B:
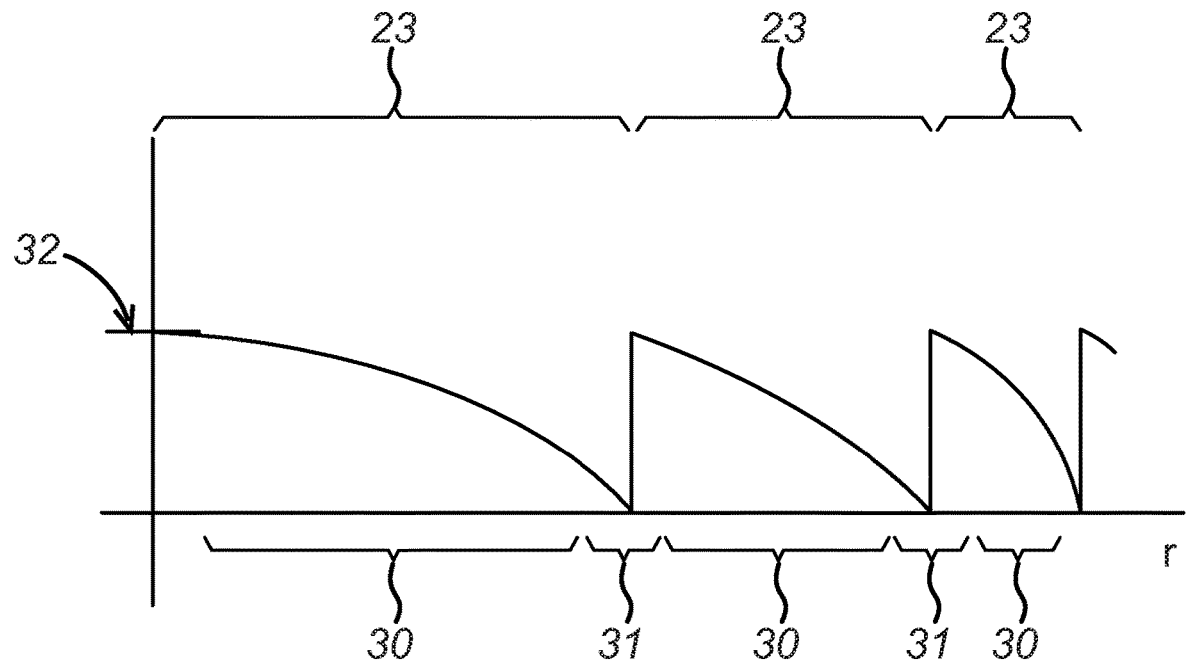

FIGS. 3A and 3B are graphical representations of a portion of a typical diffractive profile of a multifocal lens. While the graph shows only 3 echelettes, typical diffractive lenses may extend from at least 7 echelettes to over 30 echelettes. In FIG. 3A, the height 32 of the surface relief profile (from a plane perpendicular to the light rays) of each point on the echelette surface is plotted against the square of the radial distance ($r^2$ or $\rho$) from the optical axis of the lens (referred to as r-squared space). In multifocal lenses, each echelette 23 may have a diameter or distance from the optical axis which is often proportional to $A\sqrt{n}$, n being the number of the echelette 23 as counted from optical axis 24. Each echelette has a characteristic optical zone 30 and transition zone 31. Optical zone 30 has a shape or downward slope that is typically parabolic as shown in FIG. 3B. The slope of each echelette in r-squared space (shown in FIG. 3A), however, is constant over the optical zone, and for this example the same for all echelettes shown. As for the typical diffractive lens, as shown here, all echelettes have the same surface area. The area of echelettes 23 determines the diffractive powers of lens 20, and, as area and radii are correlated, the diffractive power is also related to the radii of the echelettes. The physical offset of the trailing edge of each echelette to the leading edge of the adjacent echelette is the height, or step height. An exemplary height of a transition zone 31 is marked as reference number 33 in FIG. 3A. The heights, or step heights, remain the same in r-squared space (FIG. 3A) and in linear space (FIG. 3B). The step offset is the height offset of the transition zone from the underlying base curve. Each echelette may have a radial size, defined by an inner radius and an outer radius, the difference between the outer radius and the inner radius typically approximately 0.5 mm or smaller, with the outer radius progressing potentially up to the size of the lens optic, for example 3 mm for an optic diameter of 6 mm.

As shown in FIGS. 3A and 3B, step 31 between adjacent echelettes is generally sharp and discontinuous. The height of the lens face sharply transitions from sloping steadily down-wards to stepping vertically upwards, and abruptly back to sloping steadily downwards again. In doing so, echelettes 26 also have a characteristic echelette step or height 32 defined by the vertical distance between the lowest point and highest point of the echelette. In the case of FIGS. 3A and 3B, the echelette height 32 corresponds to a step height 32 between adjacent echelettes 26. Thus, the slope (or first derivative) and/or the curvature (second derivative) of the diffractive surface in FIGS. 3A and 3B are discontinuous at the transitions from one echelette to the next echelette.

Figure 4:
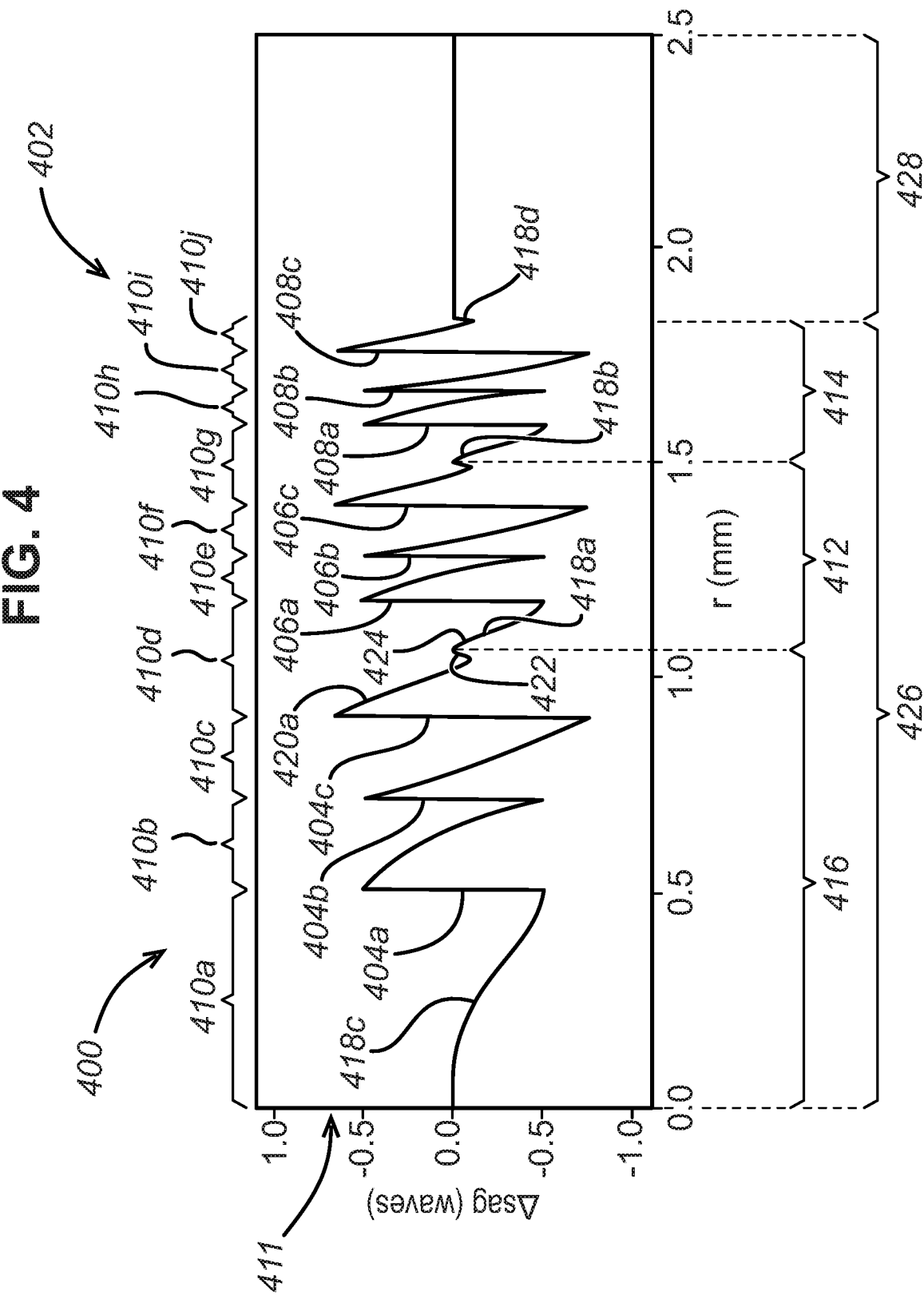
FIG. 4 illustrates a profile of an ophthalmic lens according to an embodiment of the present disclosure.

In embodiments, the diffractive profile may be varied from the configuration shown in FIGS. 3A and 3B. FIG. 4, for example, illustrates a diffractive profile 400 including a plurality of echelettes 402 and a plurality of transition zones 404a-c, 406a-c, 408b—c of the plurality of echelettes 402. The diffractive profile 400 may be positioned on an optic that is disposed about an optical axis 411, in a similar manner as shown in FIGS. 2A-3B for example. The optic may include an anterior surface and a posterior surface. In FIG. 4, the Δsag of the diffractive profile is shown on the Y-axis in units of waves and the radius from the optical axis 411 in units of millimeters is shown on the X-axis. The Δsag represents the difference with respect to the refractive base curve. The echelettes 402 of the diffractive profile 400 may include echelettes 410a—j. The echelettes 410a—j may each comprise zones confined by phase jumps. Each echelette 410a—j may include a respective optical zone.

In embodiments, at least one of the plurality of transition zones may be a vertical transition zone and at least one of the plurality of transition zones may be a curved transition zone. For example, the transition zones 404a-b, 406a-b, and 408a-b comprise vertical transition zones. The vertical transition zones 404a-b, 406a-b, and 408a-b may be essentially straight and comprise sharp transition zones that extend vertically as shown in FIG. 4. The transition zones 404c, 406c, and 408c may comprise curved transition zones. The transition zones 404c, 406c, and 408c comprise a straight section with curved sections at each end of the straight vertical section. The curved transition zones 404c, 406c, and 408c may have a curvature and may be smooth relative to the sharp transitions of the vertical transition zones 404a-b, 406a-b, and 408a-b.

The transition zones 404a-c, 406a-c, 408a-c of the diffractive profile 400 may include transition zones having a same height and may include transition zones having a different height. The transition zones 404a-c, 406a-c, 408b—c of the diffractive profile 400 may include a combination of transition zones having a same height and transition zones having a different height. Transition zones 404a, b, 406a, b, and 408a, b may each have a same height for example. Transition zones 404c, 406c, and 408c may each have a different height than the transition zones 404a, b, 406a, b, and 408a, b, which may be a greater height than the transition zones 404a, b, 406a, b, and 408a, b.

In embodiments, the height of at least one of the plurality of transition zones may be 1 wavelength. For example, transition zones 404a, b, 406a, b, and 408a, b, may have a height of 1 wavelength. In embodiments, the height of at least one of the plurality of transition zones may be between 1 wavelength and 2.4 wavelengths. For example, transition zones 404c, 406c, and 408c may have a height of between 1 wavelength and 2.4 wavelengths. In embodiments, the transition zones 404c, 406c, and 408c may have a height of between 1 wavelength and 2 wavelengths.

The step offset of the transition zones 404a, b, 406a, b, and 408a, b may each be the same in embodiments. The step offset of the transition zones 404c, 406c, 408c may be different than the step offset of the transition zones 404a, b, 406a, b, and 408a, b.

In embodiments, the diffractive profile 400 may include at least two echelettes. In embodiments, the diffractive profile 400 may include at least three echelettes. In embodiments, the diffractive profile 400 may include at least four echelettes. In embodiments, greater or lesser number of echelettes may be utilized as desired.

In embodiments, the diffractive profile 400 may include at least one set of echelettes. The set of echelettes may repeat in r-squared space upon the optic. In embodiments, a set of echelettes may include at least two echelettes. In embodiments, a set of echelettes may include at least three echelettes. In embodiments, a set of echelettes may include at least four echelettes. In embodiments, a greater or lesser number of echelettes may be included in the set. FIG. 4, for example, illustrates a set 412 including at least two echelettes (echelettes 410e, 410f) and a portion of a third echelette 410g, and a portion of a fourth echelette 410d. The portion of the third echelette 410g, and the portion of the fourth echelette 410d may each comprise a respective half of the third echelette 410g and a half of the fourth echelette 410d, yet other portions of the echelettes 410g, 410d may comprise the set 412 as desired.

The echelettes of the set 412 are each adjacent to each other. The portion of the echelette 410d comprises a leading portion of the set, followed radially outward by the adjacent echelette 410e, and followed radially outward by the adjacent echelette 410f. The portion of the echelette 410g is adjacent to the echelette 410f and radially outward from the echelette 410f.

The set 412 may repeat upon the optic. In embodiments, the set 412 may repeat upon the optic twice as shown in FIG. 4, or in embodiments the set may repeat for a greater or lesser amount as desired. In embodiments, a set may repeat in r-squared space at least two times upon the optic. In embodiments, a set may repeat in r-squared space at least three times upon the optic.

Referring to FIG. 4, the set 412 may repeat twice upon the optic. The set 412 may repeat as the set 414, including a portion of echelette 410g, echelettes 410h and 410i, and echelette 410j. Echelette 410j may comprise a repeat of the leading portion of echelette 410g. The set 414 may repeat adjacent to the set 412 and radially outward from the set 412. The set 412 may repeat as the set 416, including echelettes 410b, c and a portion of echelette 410d. Echelette 410a may comprise a repeat of the trailing portion of echelette 410d. The sets repeat in r-squared space upon the optic. In embodiments, the lines 412, 414, 416 may identify regions of the optic and diffractive profile 400 that repeat in r-squared space. The vertical and curved transition zones of the echelettes 402 may repeat in r-squared space upon the optic.

In embodiments, at least one of the plurality of echelettes 402 of the diffractive profile 400 may be non-parabolic. In embodiments, at least one of the plurality of echelettes of each set 412, 414, 416 may be non-parabolic. In embodiments, at least two of the plurality of echelettes of each set 412, 414, 416 may be non-parabolic. In embodiments, each of the plurality of echelettes of each set 412, 414, 416 may be non-parabolic. In an embodiment in which each set includes at least three echelettes, each of the at least three echelettes may be non-parabolic. In an embodiment in which each set includes at least four echelettes, each of the at least four echelettes may be non-parabolic.

In embodiments, each of the echelettes 402 of the diffractive profile 400 may be non-parabolic.

In embodiments, at least one of the plurality of optical zones of the plurality of echelettes 402 may include a subshape 418a. The subshape 418a may have a gradual change in slope that includes a change in sign of the slope. The optical zone 420 of the echelette 410d, for example, may include the subshape 418a. The subshape 418a may change in slope from the leading portion 422 of the subshape 418a to the trailing portion 424 of the subshape 418a. The slope of the subshape 418a may change two times. For example, the slope may change from the leading portion 422 to the apex of the subshape 418a, and then to the trailing portion 424 of the subshape 418a. The subshape 418a may comprise a trough and a peak.

The slope of the optical zone 420 may be negative, and then slope of the subshape 418a may change gradually to become positive (at the leading portion 422 of the subshape 418a) and subsequently changes gradually to become negative (at the trailing portion 424 of the subshape 418a).

The echelette may have an inner region, a middle portion, and an outer region. The middle portion is halfway between the inner radius and the outer radius of the echelette. The inner region is between the inner radius and the middle portion. The outer region is between the middle portion and the outer radius. The subshape 418a may be positioned on a middle portion of the echelette 410d. The peak of the subshape may be positioned on the middle portion of the echelette. In alternative embodiments, the subshape is positioned on an inner region or an outer region of the echelette. The subshape 418a may have a height that is less than a height of the transition zone 404c of the echelette 410d. The height of the subshape 418a for example, may be about 10% of the height of the transition zone 404c in embodiments, and may be about 0.1 wavelengths. In embodiments, the height of the subshape 418a relative to the transition zone 404c may be varied as desired.

The middle of the echelette may be defined as being in the middle of the inner and outer radius, or halfway between, or at 50% of the distance therebetween. Alternatively, and in principle, the subshape could be in the range of 20% to 80% of the distance between the inner and outer radius.

The subshape 418a may have a wave shape positioned on the optical zone 420 of the echelette 410d. The subshape 418a in embodiments may repeat in r-squared space upon the optic. The subshape 418a may repeat, for example, as subshape 418b. In embodiments, a portion of the subshape 418a may repeat upon the optic. For example, the trailing portion 424 of the subshape 418a may be repeated in set 416 as subshape 418c. The leading portion 422 of the subshape 418a may be repeated in set 414 as subshape 418d. As such, each set 416, 412, 414 may include a repeating leading portion and trailing portion of the subshape 418a. Set 416 includes subshape 418c as a repeat of trailing portion 424 and set 416 includes the leading portion 422. Set 412 includes the trailing portion 424 and a leading portion of subshape 418b. Set 414 includes the trailing portion of subshape 418b and subshape 418d as a repeat of the leading portion 422.

In embodiments, the diffractive profile 400 may be offset from the zero-phase line to center the profile around $\Delta_{sag}=0$. A more consistent through wavelength performance may be provided.

In embodiments, the optic that the diffractive profile 400 is provided upon may include a central zone 426 and a peripheral zone 428. In embodiments, the diffractive profile 400 may be positioned upon the central zone 426 and may extend to the outer radius of the central zone 426. For example, as shown in FIG. 4, the diffractive profile 400 may extend to a radius of about 1.8 millimeters, although varying distances may be utilized in embodiments. The peripheral zone 428 may extend radially outward from the central zone 426 and may include a refractive profile. For example, a diffractive profile may not be included upon the peripheral zone 428 and the peripheral zone 428 may refract light. The diffractive profile 400 may extend only partially over the full surface of the optic in embodiments. Such a feature may provide improved distance vision and reduced visual symptoms at large pupil sizes. In general, a refractive profile can be an aspheric profile, and/or provide features as correction of spherical aberration, optimized distance vision, or provide an extended depth of focus for improved intermediate or near vision.

In embodiments, the central zone 426 may have a first refractive shape, which may include a refractive curvature. The first refractive shape may be a base refractive shape providing a base power. The diffractive profile 400 may be positioned upon the first refractive shape. The peripheral zone 428 in embodiments may have a second refractive shape that may have a different curvature than the first refractive shape. For example, the peripheral zone 428 may have a greater curvature than the first refractive shape of the central zone 426. The peripheral zone 428 may have a greater optical power with respect to the central zone 426 (e.g., +1.96 D, +2 D, or +1.85 D, among other amounts of optical power). In embodiments, the optic may have multiple spherical curvatures for different regions. Such a feature may allow for varying degrees of chromatic correction depending on pupil size. Fine adjustment of performance may be provided for specific pupil sizes. In embodiments, a greater number of zones (e.g., 3 zones, 4 zones, etc., each with a different refractive curvature may be provided as desired). For example, three or more different refractive curvatures may be provided in embodiments. In embodiments, various other configurations of the optic may be provided.

In embodiments, the profile represented in FIG. 4 (including the diffractive profile 400 and the refractive profile of the peripheral zone 428) may be provided on a posterior surface of an optic. In embodiments, an anterior surface of the optic may be an aspheric surface. In embodiments, the aspheric surface of the optic may be configured to reduce corneal spherical aberration. In embodiments, a profile represented in FIG. 4 may be provided on an anterior surface and a posterior surface may comprise an aspheric surface. In embodiments, various other configurations of the optic may be provided, including other configurations of anterior surfaces or posterior surfaces.

The optic may be configured to produce a range of vision for an eye. In embodiments, the anterior surface and the posterior base refractive shape may be configured to provide the majority of the optic power. The diffractive profile 400 may redistribute the light to provide a range of vision for an eye.

The optic may further beneficially correct varying degrees of chromatic aberration at different distances, including at distance vision. The chromatic correction may be highest at an intermediate distance and may be partial at both near and distance ranges. The optic may have a greater chromatic correction at an intermediate vision than at a distance vision. In embodiments, the optic may have a greater chromatic correction at an intermediate vision than at a near vision. In embodiments, the optic may have a greater chromatic correction at an intermediate vision than at both a near vision and a distance vision. In embodiments, the optic may provide a greater chromatic correction at a distance vision than at an intermediate vision. In embodiments, the optic may provide a greater chromatic correction at a distance vision than at a near vision. In embodiments, the optic may provide a greater chromatic correction at a distance vision and an intermediate vision than at a near vision. In embodiments, the optic may provide a greater chromatic correction at a near vision and an intermediate vision than at a distance vision. Various other amounts of chromatic correction at distances may be provided as desired.

The diffractive profile 400 in embodiments, may comprise an achromat that is configured to produce a chromatic correction. The achromat may be positioned at the central zone 426 of the optic. The achromat may comprise an inner achromat. The peripheral zone 428 of the optic being a refractive zone may allow for a varying amount of chromatic correct spatially upon the optic. In embodiments, the diffractive profile 400 may be configured to provide a distance vision at a second diffractive order, although distance vision may be provided at other diffractive orders as desired (e.g., a $0^{th}$, a $1^{st}$, a $3^{rd}$, a $4^{th}$, etc.).

Various other configurations of optics may be provided.

Figure 5:
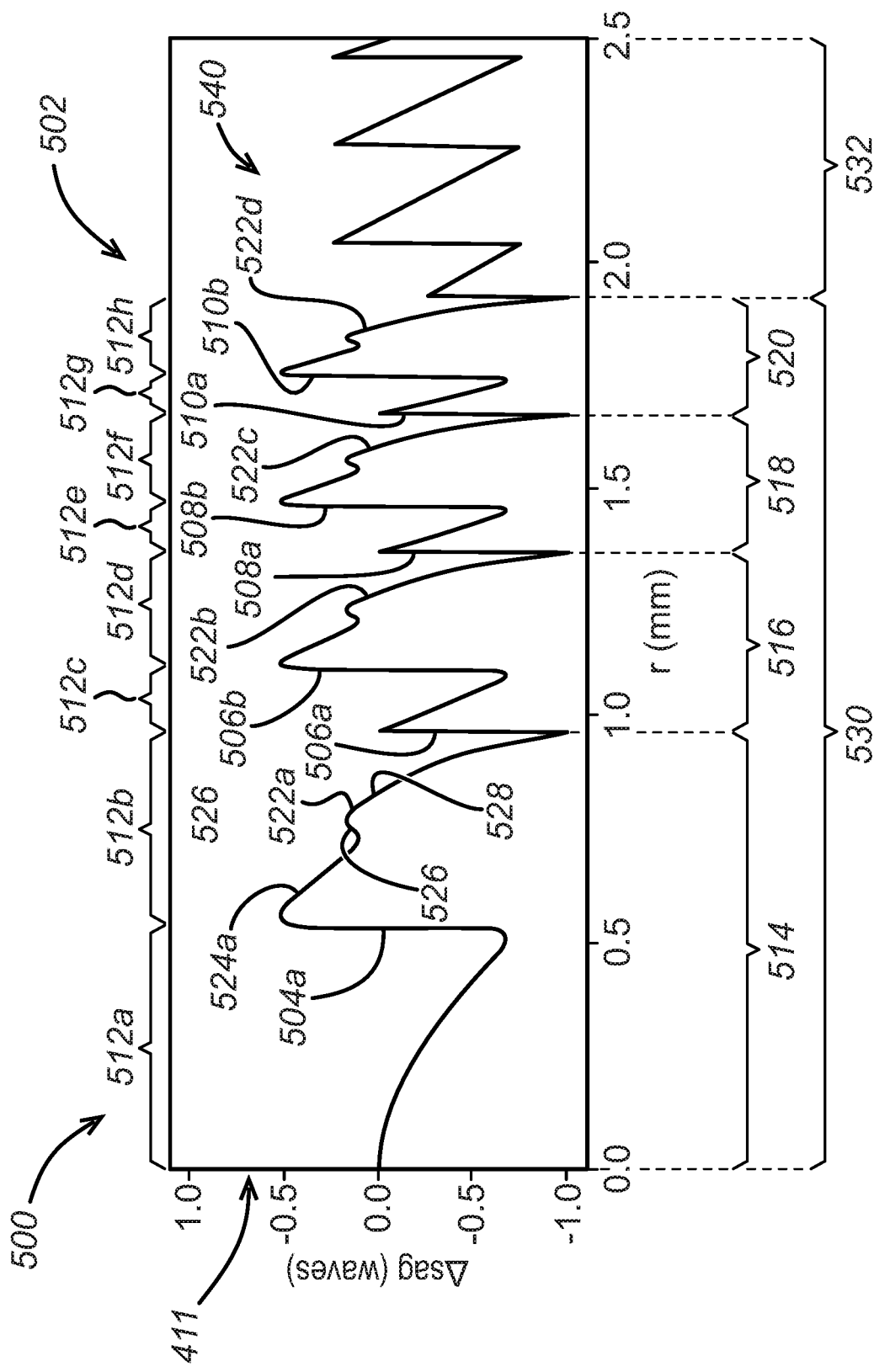
FIG. 5 illustrates a profile of an ophthalmic lens according to an embodiment of the present disclosure.

FIG. 5 illustrates a diffractive profile 500 including a plurality of echelettes 502 and a plurality of transition zones 504a, 506a, b, 508a, b, and 510a, b of the plurality of echelettes 502. The diffractive profile 500 may be positioned on an optic that is disposed about an optical axis 511, in a similar manner as shown in FIGS. 2A-3B for example. The optic may include an anterior surface and a posterior surface. In FIG. 5, the Δsag of the diffractive profile is shown on the Y-axis in units of waves and the radius from the optical axis 511 in units of millimeters is shown on the X-axis. The Δsag represents the difference with respect to the refractive base curve.

The echelettes 502 of the diffractive profile 500 may include echelettes 512a-h. The echelettes 512a-h may each comprise zones confined by phase jumps. Each echelette 512a-h may include a respective optical zone.

In embodiments, at least one of the plurality of transition zones may be a vertical transition zone and at least one of the plurality of transition zones may be a curved transition zone. For example, the transition zones 506a, 508a, 510a comprise vertical transition zones. The vertical transition zones 506a, 508a, 510a may be essentially straight and comprise sharp transition zones that extend vertically as shown in FIG. 5. The transition zones 504a, 506b, 508b, 510b may comprise curved transition zones. The transition zones 504a, 506b, 508b, 510b comprise a straight section with curved sections at each end of the straight vertical section. The curved transition zones 504a, 506b, 508b, 510b may have a curvature and may be smooth relative to the sharp transitions of the vertical transition zones 506a, 508a, 510a.

The transition zones 504a, 506a, b, 508a, b, and 510a, b of the diffractive profile 500 may include transition zones having a same height and may include transition zones having a different height. The transition zones 504a, 506a, b, 508a, b, and 510a, b of the diffractive profile 500 may include a combination of transition zones having a same height and transition zones having a different height. Transition zones 504a, 506b, 508b, 510b may each have a same height for example. Transition zones 506a, 508a, 510a may each have a different height than the transition zones 504a, 506b, 508b, 510b, which may be a greater height than transition zones 506a, 508a, 510a.

In embodiments, the height of at least one of the plurality of transition zones may be 1 wavelength. For example, transition zones 506a, 508a, and 510a, may have a height of 1 wavelength. In embodiments, the height of at least one of the plurality of transition zones may be between 1 wavelength and 2.4 wavelengths. For example, transition zones 504a, 506b, 508b, 510b may have a height of between 1 wavelength and 2.4 wavelengths. In embodiments, the transition zones 504a, 506b, 508b, 510b may have a height of between 1 wavelength and 2 wavelengths.

The step offset of the transition zones 504a, 506b, 508b, 510b may each be the same in embodiments. The step offset of the transition zones 506a, 508a, 510a may be different than the step offset of the transition zones 504a, 506b, 508b, 510b.

In embodiments, the diffractive profile 500 may include at least two echelettes. In embodiments, the diffractive profile 500 may include at least three echelettes. In embodiments, the diffractive profile 500 may include at least four echelettes. In embodiments, greater or lesser number of echelettes may be utilized as desired.

In embodiments, the diffractive profile 500 may include at least one set of echelettes. The set of echelettes may repeat in r-squared space upon the optic. In embodiments, a set of echelettes may include at least two echelettes. In embodiments, a greater or lesser number of echelettes may be included in the set. FIG. 5, for example, illustrates a set 514 including at least two echelettes (echelettes 512a, 512b).

The echelettes of the set 514 are each adjacent to each other. The leading echelette comprises the echelette 512a, followed radially outward by the echelette 512b. The set 514 may repeat upon the optic. In embodiments, the set 514 may repeat upon the optic three times as shown in FIG. 5, or in embodiments the set may repeat for a greater or lesser amount as desired. In embodiments, a set may repeat in r-squared space at least two times upon the optic. In embodiments, a set may repeat in r-squared space at least three times upon the optic.

Referring to FIG. 5, the set 514 may repeat as the set 516, including echelettes 512c, d. The set 514 may repeat as the set 518, including echelettes 512e, 512f. The set 514 may repeat as the set 520, including echelettes 512g, 512h. The sets repeat in r-squared space upon the optic. The vertical and curved transition zones of the echelettes 502 may repeat in r-squared space upon the optic.

In embodiments, at least one of the plurality of echelettes 502 of the diffractive profile 500 may be non-parabolic. In embodiments, at least one of the plurality of echelettes of each set 514, 516, 518, 520 may be non-parabolic. In embodiments, each of the plurality of echelettes of each set 514, 516, 518, 520 may be non-parabolic. In an embodiment in which each set includes at least two echelettes, each of the at least two echelettes may be non-parabolic.

In embodiments, each of the echelettes 502 of the diffractive profile 500 may be non-parabolic.

In embodiments, at least one of the plurality of optical zones of the plurality of echelettes 502 may include a subshape 522a. The subshape 522a may have a gradual change in slope that includes a change in sign of the slope. The optical zone 524 of the echelette 512b, for example, may include the subshape 522a. The subshape 522a may change in slope from the leading portion 526 of the subshape 522a to the trailing portion 528 of the subshape 522a. The slope of the subshape 522a may change two times. For example, the slope may change from the leading portion 526 to the apex of the subshape 522a, and then to the trailing portion 528 of the subshape 522a.

The slope of the optical zone 524 may be negative, and the slope of the subshape 522a may change gradually to become positive (at the leading portion 526 of the subshape 522a) and subsequently changes gradually to become negative (at the trailing portion 528 of the subshape 522a).

The subshape 522a may be positioned on a middle portion of the echelette 512b. The subshape 522a may have a height that is less than a height of the transition zone 504a of the echelette 512b. The height of the subshape 522a for example, may be about 10% of the height of the transition zone 504a in embodiments, and may be about 0.1 wavelengths. In embodiments, the height of the subshape 522a relative to the transition zone 504a may be varied as desired.

The subshape 522a may have a wave shape positioned on the optical zone 524 of the echelette 512b. The subshape 522a in embodiments may repeat in r-squared space upon the optic. The subshape 522a may repeat, for example, as subshape 522b. The subshape 522a may repeat as subshape 522c. The subshape 522a may repeat as subshape 522d. As such, each set 514, 516, 518, 520 may include a respective subshape 522a, 522b, 522c, 522d.

In embodiments, the diffractive profile 500 may be offset from the zero-phase line to center the profile around $\Delta_{sag}=0$. A more consistent through wavelength performance may be provided.

In embodiments, the optic that the diffractive profile 500 is provided upon may include a central zone 530 and a peripheral zone 532. In embodiments, the diffractive profile 500 may be positioned upon the central zone 530 and may extend to the outer radius of the central zone 530. For example, as shown in FIG. 5, the diffractive profile 500 may extend to a radius of about 1.9 millimeters, although varying distances may be utilized in embodiments.

The peripheral zone 532 may extend radially outward from the central zone 530 and may include a diffractive profile 540 that includes a plurality of parabolic echelettes having heights of 1 wavelength. The diffractive profile 540, for example, may comprise a monofocal achromat. The diffractive profile 540 may comprise a second diffractive profile on the optic that may be adjacent to the diffractive profile 500 and positioned radially outward of the diffractive profile 500. The peripheral zone 532 may extend radially outward from the optical axis 511 and end at a distance of about 2.4 millimeters as shown in FIG. 5, or may end at a greater or lesser distance as desired. In embodiments, the full optical surface of the optic may include a diffractive profile.

In embodiments, the central zone 530 and peripheral zone 532 may each have a first refractive shape, which may include a refractive curvature. The first refractive shape may be a base refractive shape providing a base power. The peripheral zone 532 in embodiments may have a refractive shape that may have a same curvature as the first refractive shape. A single spherical curvature dependent on the desired lens base power may be provided in embodiments. In embodiments, various other configurations of the optic may be provided.

In embodiments, the profile represented in FIG. 5 (including the diffractive profiles 500, 540) may be provided on a posterior surface of an optic. In embodiments, an anterior surface of the optic may be an aspheric surface. In embodiments, the aspheric surface of the optic may be configured to reduce corneal spherical aberration. In embodiments, various other configurations of the optic may be provided. In embodiments, a profile represented in FIG. 5 may be provided on an anterior surface and a posterior surface may comprise an aspheric surface. In embodiments, various other configurations of the optic may be provided, including other configurations of anterior surfaces or posterior surfaces.

The optic may be configured to produce a range of vision for an eye. In embodiments, the anterior surface and the posterior base refractive shape may be configured to provide the majority of the optic power. The diffractive profile 500 may redistribute the light to provide a range of vision for an eye.

The optic may further beneficially correct varying degrees of chromatic aberration at different distances, including at distance vision. The chromatic correction may be highest at an intermediate distance and may be partial at both near and distance ranges. The optic may have a greater chromatic correction at an intermediate vision than at a distance vision. In embodiments, the optic may have a greater chromatic correction at an intermediate vision than at a near vision. In embodiments, the optic may have a greater chromatic correction at an intermediate vision than at both a near vision and a distance vision. In embodiments, the optic may provide a greater chromatic correction at a distance vision than at an intermediate vision. In embodiments, the optic may provide a greater chromatic correction at a distance vision than at a near vision. In embodiments, the optic may provide a greater chromatic correction at a distance vision and an intermediate vision than at a near vision. In embodiments, the optic may provide a greater chromatic correction at a near vision and an intermediate vision than at a distance vision. Various other amounts of chromatic correction at distances may be provided as desired.

The diffractive profile 500 in embodiments, may comprise an achromat that is configured to produce a chromatic correction. The achromat may be positioned at the central zone 530 of the optic. The achromat may comprise an inner achromat. In embodiments, the diffractive profile 500 may be configured to provide a distance vision at a first diffractive order, although distance vision may be provided at other diffractive orders as desired (e.g., a $0^{th}$, a $2^{nd}$, a $3^{rd}$, a $4^{th}$, etc.).

The design wavelength of the optics disclosed herein may be 550 nanometers in embodiments, although other wavelengths may be utilized in embodiments as desired.

An optic for an ophthalmic lens that includes a profile disclosed herein may be fabricated utilizing a variety of methods. A method may include determining optical aberrations of a patient's eye. Measurements of a patient's eye may be made in a clinical setting, such as by an optometrist, ophthalmologist, or other medical or optical professional. The measurements may be made via manifest refraction, autorefraction, tomography, or a combination of these methods or other measurement methods. The optical aberrations of the patient's eye may be determined. Physical characteristics of the patient's eye may also be measured, such as pupil size and dilated and contracted sizes of the pupil may also be determined.

The measurements of the patient's eye may be placed in an ophthalmic lens prescription, which includes features of an optic that are intended to address the optical aberrations of the patient's eye, as well as features that address the pupillary size (including dilated and contracted sizes) of the patient.

The ophthalmic lens prescription may be utilized to fabricate an optic for the ophthalmic lens. A refractive profile of the optic, and a diffractive profile, among other properties may be determined based on the ophthalmic lens prescription.

The determination of a profile of the optic and the fabrication of the optic may be performed remotely from the optometrist, ophthalmologist, or other medical or optical professional that performed the measurements of a patient's eye, or may be performed in the same clinical facility of such an individual. If performed remotely, the fabricated optic may be delivered to an optometrist, ophthalmologist, or other medical or optical professional, for being provided to a patient. For an intraocular lens, the fabricated optic may be provided for implant into a patient's eye.

The fabricated optic may be a custom optic fabricated specifically for the patient's eye, or may be fabricated in a manufacturing assembly and then selected by an optometrist, ophthalmologist, or other medical or optical professional for supply to a patient, which may include implantation in the patient's eye.

Figure 6:
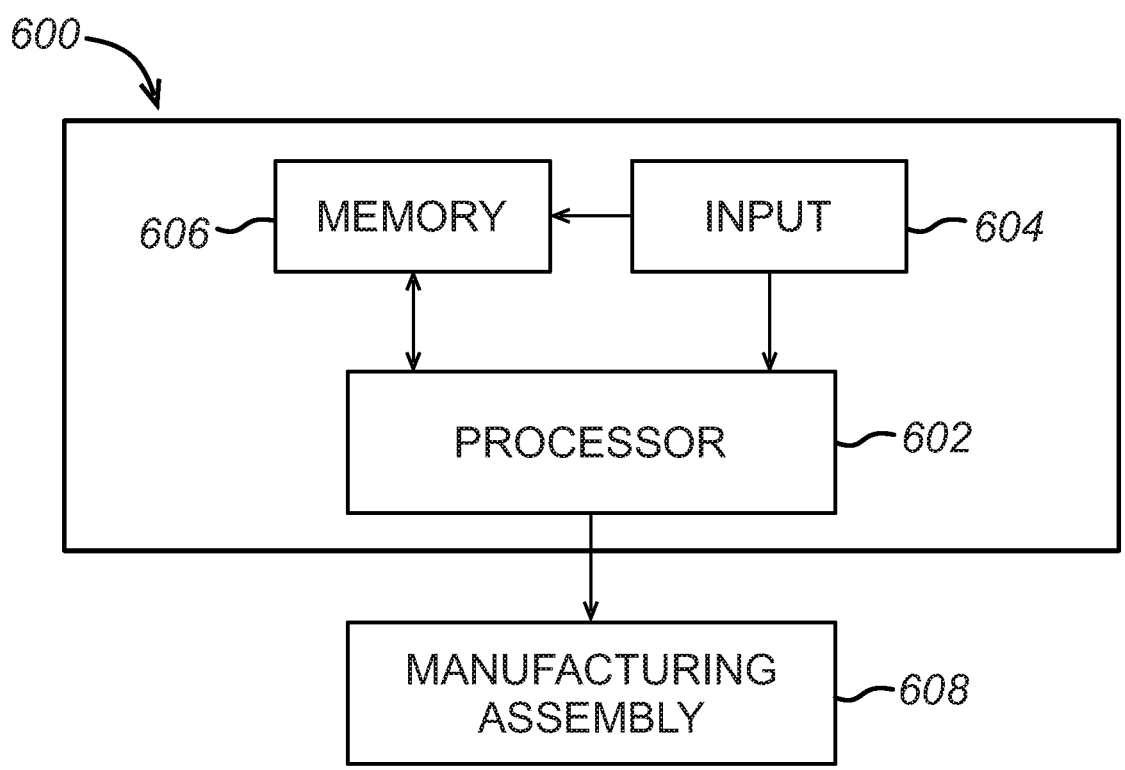
FIG. 6 illustrates an embodiment of a system.

FIG. 6 illustrates an embodiment of a system 600 that may be utilized to perform all or a portion of the methods disclosed herein. The system 600 may include a processor 602, an input 604, and a memory 606. In certain embodiments the system 600 may include a manufacturing assembly 608.

The processor 602 may comprise a central processing unit (CPU) or other form of processor. In certain embodiments the processor 602 may comprise one or more processors. The processor 602 may include one or more processors that are distributed in certain embodiments, for example, the processor 602 may be positioned remote from other components of the system 600 or may be utilized in a cloud computing environment. The memory 606 may comprise a memory that is readable by the processor 602. The memory 606 may store instructions, or features of intraocular lenses, or other parameters that may be utilized by the processor 602 to perform the methods disclosed herein. The memory 606 may comprise a hard disk, read-only memory (ROM), random access memory (RAM) or other form of non-transient medium for storing data. The input 604 may comprise a port, terminal, physical input device, or other form of input. The port or terminal may comprise a physical port or terminal or an electronic port or terminal. The port may comprise a wired or wireless communication device in certain embodiments. The physical input device may comprise a keyboard, touchscreen, keypad, pointer device, or other form of physical input device. The input 604 may be configured to provide an input to the processor 602.

The system 600 may be utilized to perform the methods disclosed herein, such as the processes of determining a profile of an optic.

The processor 602 may provide the profile of the optic to the manufacturing assembly 608, which may be configured to fabricate the optic for the ophthalmic lens based on the profile. The manufacturing assembly 608 may comprise one or more apparatuses for forming the optic, and may comprise a high volume manufacturing assembly or a low volume manufacturing assembly. The manufacturing assembly 608 may be used for manufacture remote to a clinic in which measurements of the individual's eye or made, or local to such a clinic. The manufacturing assembly may include apparatuses such as lathe tools, or other lens formation devices to fabricate the optic.

In one embodiment, the processor 602 may be provided with an ophthalmic lens prescription for the individual's eye that may be provided as discussed herein. The processor 602 may receive the ophthalmic lens via the input 604. The system 600 may fabricate the optic for the ophthalmic lens based on the prescription.

The system 600 may be configured to fabricate any of the embodiments of ophthalmic lenses disclosed herein.

Any of the embodiments of lens profiles discussed herein may be apodized to produce a desired result. The apodization may result in the step heights and step offsets of the echelettes being gradually varied according to the apodization, as to gradually increasing the amount of light in the distance focus as a function of pupil diameter.

The features of the optics disclosed herein may be utilized by themselves, or in combination with refractive profiles of the optics and/or with other features providing for correction of chromatic aberrations.

The ophthalmic lenses disclosed herein in the form of intraocular lenses are not limited to lenses for placement in the individual's capsular bag. For example, the intraocular lenses may comprise those positioned within the anterior chamber of the eye. In certain embodiments the intraocular lenses may comprise "piggy back" lenses or other forms of supplemental intraocular lenses.

Features of embodiments may be modified, substituted, excluded, or combined as desired.

In addition, the methods herein are not limited to the methods specifically described, and may include methods of utilizing the systems and apparatuses disclosed herein.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods as disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations on these described embodiments will become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems, apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. An ophthalmic lens comprising:
  an optic disposed about an optical axis and having an anterior surface and a posterior surface, and including a diffractive profile including a plurality of echelettes, wherein a first echelette of the plurality of echelettes includes an optical zone, wherein the optical zone includes a subshape having a gradual change in slope that includes a change in sign of the slope, and wherein a second echelette of the plurality of echelettes lacks a subshape having a gradual change in slope that includes a change in sign of the slope, and wherein the second echelette has a vertical transition zone, and wherein the first echelette has a curved transition zone between the first echelette and the second echelette.

2. The ophthalmic lens of claim 1, wherein the subshape of the first echelette comprises a height variation with respect to a profile of the first echelette were the subshape not present on the first echelette.

3. The ophthalmic lens of claim 2, wherein the height variation is less than 25% of an overall height of the first echelette, or less than 20% of an overall height of the first echelette, or less than 15% of an overall height of the first echelette, or less than 10% of an overall height of the first echelette, or less than 5% of an overall height of the first echelette.

4. The ophthalmic lens of claim 2, wherein the optic includes a central zone and the diffractive profile is positioned on the central zone.

5. The ophthalmic lens of claim 4, wherein the central zone has a first refractive shape, and the optic includes a peripheral zone having a second refractive shape with a greater curvature than the first refractive shape.

6. The ophthalmic lens of claim 5, wherein the peripheral zone has a refractive profile.

7. The ophthalmic lens of claim 4, wherein the central zone has a first refractive shape, and the optic includes a peripheral zone having a second refractive shape with a same curvature as the first refractive shape.

8. The ophthalmic lens of claim 7, wherein the diffractive profile is a first diffractive profile and the optic includes a peripheral zone including a second diffractive profile having a plurality of parabolic echelettes having heights of between 0.9 and 1.1 wavelength.

9. The ophthalmic lens of claim 2, wherein the diffractive profile is configured to provide distance vision at a second diffractive order.

10. The ophthalmic lens of claim 2, wherein the diffractive profile is configured to provide distance vision at a first diffractive order.

11. The ophthalmic lens of claim 2, wherein at least one of the plurality of echelettes is non-parabolic.

12. The ophthalmic lens of claim 2, wherein the plurality of echelettes includes a set of at least two echelettes that repeats in r-squared space upon the optic.

13. The ophthalmic lens of claim 12, wherein the set repeats in r-squared space at least two times upon the optic.

14. The ophthalmic lens of claim 13, wherein the set repeats in r-squared space at least three times upon the optic.

15. The ophthalmic lens of claim 13, wherein the set includes the first echelette and the second echelette.

16. The ophthalmic lens of claim 15, wherein the set repeats in r-squared space at least three times upon the optic.

17. The ophthalmic lens of claim 12, wherein each of the at least two echelettes of the set is non-parabolic.

18. The ophthalmic lens of claim 17, wherein the set includes at least two echelettes and a portion of a third echelette, the set repeating in r-squared space upon the optic.

19. The ophthalmic lens of claim 18, wherein the set includes a portion of a fourth echelette, the set repeating in r-squared space upon the optic.

20. The ophthalmic lens of claim 2, wherein a height of a transition zone of at least one of the plurality of echelettes is 1 wavelength.

21. The ophthalmic lens of claim 2, wherein a height of a transition zone of at least one of the plurality of echelettes is between 1 wavelength and 2 wavelengths.

22. The ophthalmic lens of claim 2, wherein the slope of the subshape of the first echelette changes two times.

23. The ophthalmic lens of claim 22, wherein a slope of the optical zone including the subshape is negative, and the slope of the subshape changes gradually to become positive and subsequently changes gradually to become negative.

24. The ophthalmic lens of claim 2, wherein the subshape of the first echelette is positioned on a middle portion of the first echelette.

25. The ophthalmic lens of claim 2, wherein the subshape of the first echelette has a height that is less than a height of the transition zone of the first echelette.

26. The ophthalmic lens of claim 25, wherein the first echelette repeats in r-squared space upon the optic.

27. The ophthalmic lens of claim 26, wherein the subshape of the first echelette repeats in r-squared space upon the optic.

28. The ophthalmic lens of claim 27, wherein the plurality of echelettes includes a set of at least two echelettes and a portion of the subshape, the set repeating in r-squared space upon the optic.

29. The ophthalmic lens of claim 2, wherein the diffractive profile includes a plurality of transition zones of the plurality of echelettes, at least one of a plurality of the transition zones being a vertical transition zone and at least one of a plurality of the transition zones being a curved transition zone.

30. The ophthalmic lens of claim 29, wherein the curved transition zone repeats in r-squared space upon the optic.

31. The ophthalmic lens of claim 2, wherein a height of a transition zone of each echelette of the plurality of echelettes is the same for all echelettes in r-squared space.

32. The ophthalmic lens of claim 2, wherein the optic has a greater chromatic correction at an intermediate vision than at a distance vision.

33. The ophthalmic lens of claim 2, wherein the optic has a greater chromatic correction at an intermediate vision than at a near vision.

* * * * *